(12) United States Patent
Gibson et al.

(10) Patent No.: US 6,555,636 B1
(45) Date of Patent: Apr. 29, 2003

(54) POLYMERISATION CATALYST

(75) Inventors: Vernon Charles Gibson, London (GB); Duncan Frank Wass, London (GB)

(73) Assignee: BP Chemicals Limited, London (GB)

( * ) Notice: Subject to any disclaimer, the term of this patent is extended or adjusted under 35 U.S.C. 154(b) by 31 days.

(21) Appl. No.: 09/708,062

(22) Filed: Nov. 8, 2000

Related U.S. Application Data

(63) Continuation of application No. PCT/GB99/01376, filed on May 4, 1999.

(30) Foreign Application Priority Data

May 8, 1998 (GB) .............................................. 9809926

(51) Int. Cl.$^7$ ................................................. C08F 4/42
(52) U.S. Cl. ...................... 526/172; 526/348; 526/161; 526/135; 526/147; 526/111; 502/167
(58) Field of Search ................................. 526/348, 161, 526/135, 147, 172, 111; 502/167

(56) References Cited

FOREIGN PATENT DOCUMENTS

| WO | WO 96/30421 | * 10/1996 |
|----|-------------|-----------|
| WO | WO 97/47661 | * 12/1997 |

* cited by examiner

*Primary Examiner*—David W. Wu
*Assistant Examiner*—Ling-Siu Choi
(74) *Attorney, Agent, or Firm*—Finnegan, Henderson, Farabow, Garrett & Dunner, L.L.P.

(57) ABSTRACT

A catalyst composition for the polymerization of radically polymerisable monomer is disclosed, which comprises (i) an initiator having a radically transferable atom or group and (ii) a component of Formula (I): $\{Fe[T]L\}.(T/b)X$, wherein Fe is iron and T its oxidation state, L is a ligand of Formula (II): $R_1-N=CH-(CH_2)_n-CH=N-R_2$, in which $R_1$ and $R_2$ are independently selected from $C_1$ $C_{10}$ alkyl, aryl and substituted aryl, and n is 0 or 1; X represents an atom or group covalently or ionically bonded to Fe; b is the valency of the atom or group X.

17 Claims, No Drawings

POLYMERISATION CATALYST

RELATED APPLICATION

This application is a continuation of international application No. PCT/GB99/01376 filed May 4, 1999.

The present invention relates to novel catalyst compositions and to the polymerisation of olefinically unsaturated monomers using said catalyst compositions.

A recent development in the control of radical polymerisation systems is atom transfer radical polymerisation (ATRP) based on a redox reaction with a transition metal compound. ATRP is believed to result from two parameters (i) the presence of a low constant concentration of growing radicals and (ii) a fast and reversible equilibrium between the growing radicals and the dormant polymer species. If the concentration of growing radicals is kept low enough and a fast and reversible equilibrium between growing radicals and the dormant polymer species is established the proportion of termination reactions in comparison to propagation can be minimised which results in better predictability of molecular weight and lower polydispersities. A more detailed discussion of the mechanism of ATRP may be found in Patent Application No. WO 96/30421.

Patent Application No. WO 96/30421 describes a method for atom or group transfer radical polymerisation of an alkene such as styrene whereby the alkene is polymerised in the presence of an initiator, a transition metal compound and a ligand and the formed polymer is subsequently isolated. The use of an alkyl halide initiator, copper (I) chloride, and bipyridine ligand to produce controlled molecular weight polymers of low polydispersity is described.

However the process described in WO 96/30421 has the disadvantage that it is a heterogeneous system due to the fact that the copper catalyst is only partially soluble in the polymerisation system. Thus it is difficult to determine the level of active catalyst in polydispersity of the final product. Heterogeneous catalysts are also known to be less efficient than homogeneous catalysts in terms of g/g productivity, and also require specific separation steps from the product in commercial use. As a result, homogeneous systems are generally preferred where possible.

Patent Application No. WO 97/47661 describes the use of copper diimine complexes which allow homogeneous atom transfer polymerisation of olefinically unsaturated monomers and thus the level of active catalyst in the mixture to be controlled. However rates of conversion for styrene using these complexes are relatively low, and polydispersities (Mw/Mn) relatively high.

SUMMARY OF THE INVENTION

It has now been surprisingly found that by using a catalyst system which includes particular iron complexes improved control over the activity of the catalyst system can be achieved, thereby ultimately providing an improved product.

According to the present invention there is provided a catalyst composition comprising
(i) an initiator having a radically transferable atom or group, and
(ii) a component of Formula I

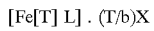  [Fe[T] L] . (T/b)X    Formula I wherein
Fe is iron and T its oxidation state L is a ligand of Formula II

  $R^1$—N=CH—$(CH_2)_n$—CH=N—$R^2$    Formula II in which $R^1$ and $R^2$ are independently selected from $C_1$–$C_{10}$ alkyl, aryl and substituted aryl, and n is 0 or 1;

X represents an atom or group covalently or ionically bonded to Fe;

b is the valency of the atom or group X.

DETAILED DESCRIPTION OF THE INVENTION

The initiator suitable for use in the present invention may be any initiator having a radically transferable atom or group. Examples of suitable initiators include conventional atom transfer radical addition initiators, for example, organic halides, such as alkyl halides, e.g. alkyl chlorides or bromides such as $CCl_4$, $CHCl_3$ and $CCl_3Br$, activated alkyl halides e.g. alkyl halides containing at least one alpha-electron withdrawing group such as an ester, e.g. 2-bromoethylisobutyrate or a ketone, e.g. 2-bromoisobutyrophenone or an optionally substituted aryl e.g. phenyl or nitro-substituted phenyl. Other suitable initiators include arenesulphonyl chlorides which can be substituted or unsubstituted such as para-toluenesulphonyl chloride and para-methoxybenzenesulphonyl chloride. Preferred initiators include $CCl_4$ and para-toluenesulphonyl chloride.

It will be understood that such initiators may also be molecules (monomeric or polymeric) which contain more than one radically transferrable atom or group. Examples of monomeric multifunctional initiators include alkyl dihalides and sulphonyl halides such as 1,3-benzene disulphonyl chloride. Suitable initiators for the invention also include polymers, which may optionally be based on styrene, which contain one or more radically transferable group present at the chain ends and/or pendent to the main chain and distributed along its length. It will be understood that such multifunctional initiators provide access to star branched and grafted polymer architectures with the enhanced potential to fine-tune properties. The use of mixed initiators is also within the scope of the invention.

In the Formula I, Fe may be Fe(II) or Fe(III), most preferably Fe(II). The atom or group represented by X in the Formula I is preferably selected from halide, sulphate, nitrate, thiolate, thiocarboxylate, $BF_4^-$, $PF_6^-$, hydride, carboxylate, triflate, cyano, arylsulphonate, hydrocarbyl, substituted hydrocarbyl, heterohydrocarbyl, $C_1$–$C_6$ alkoxy. Examples of such atoms or groups are chloride, bromide, fluoride, iodide, phenyl, benzyl, methoxide, ethoxide, isopropoxide, tosylate, benzenesulphonate, toluenesulphonate, formate, acetate, phenoxide and benzoate. Most preferred is chloride.

$R^1$ and $R^2$ are independently $C_1$–$C_{10}$ alkyl or aryl or substituted aryl. When one or both of $R^1$ and $R^2$ is $C_1$–$C_{10}$ alkyl, it is for example, methyl, ethyl, n-propyl, i-propyl, n-butyl, t-butyl, n-hexyl, n-octyl, and n-decyl. $C_1$–$C_6$ alkyl is generally preferred, especially t-butyl.

When one or both of $R^1$ and $R^2$ is aryl, it is preferably $C_6$–$C_{10}$ aryl, for example, phenyl.

When one or both of $R^1$ and $R^2$ is a substituted aryl group, it may have from 7 to 24 carbon atoms, and be substituted at e.g. one or both ortho positions and/or the para position with, for example, $C_1$–$C_6$ alkyl such as methyl, ethyl, n-propyl, i-propyl, n-butyl, t-butyl, especially t-butyl. An example is 2,6 di-i-propyl phenyl.

Preferably $R^1$ and $R^2$ are the same: preferably n is zero.

A preferred combination is where $R^1$ and $R^2$ are each 2,6 di-isopropyl phenyl and n=0. An especially preferred combination is where $R^1$ and $R^2$ are each t-butyl and n=0.

Compounds of Formula II can be prepared using procedures known to the man skilled in the art and disclosed in published literature for example as described in Z. Naturforsch, 1981, 36b, 823.

The present invention further provides a process for the polymerisation and copolymerisation of a radically polymerisable monomer comprising contacting the monomer under polymerisation conditions with the catalyst composition of the present invention. A further aspect of the invention is the use of the above-defined composition as a polymerisation catalyst for radically polymerisable monomers.

Monomers suitable for use in the polymerisation process of the present invention include any radically polymerisable monomer. Preferred monomers include ethylene; optionally substituted conjugated dienes such as 1,3-butadiene, isoprene; acids and anhydrides such as acrylic acid or acrylic anhydride; (meth)acrylamides; vinyl halides e.g. vinyl chloride; (meth)acrylonitrile; (meth)acrylate esters of $C_1$–$C_{20}$ alcohols e.g. methyl methacrylate, ethyl methacrylate, propyl methacrylate (all isomers), butyl methacrylate (all isomers); vinyl esters of $C_1$–$C_{20}$ alcohols e.g. vinyl acetate, vinyl propionate or vinyl butyrate; vinyl amides such as vinyl pyrrolidone, and other vinyl amides having up to 8 carbon atoms; vinyl ketones such as ethylvinyl ketone, butylvinyl ketone and other vinyl ketones having up to 8 carbon atoms; vinyl substituted aryls e.g. vinyl substituted phenyls, vinyl substituted naphthyls. The aryl ring may be substituted by at least one vinyl group such as 1–2 vinyl groups. Examples include styrene and 1,4 divinyl benzene. The vinyl group(s) may be substituted or unsubstituted, e.g. substituted styrenes. Suitable . vinyl group substituents include a $C_1$–$C_6$ alkyl (preferably at the alpha-carbon atom) e.g. methyl. Examples include alpha-methyl styrene. The vinyl substituted aryl may also have at least 1, preferably 1 to 3 substituents on the aryl ring. Thus, phenyl may be substituted by 1 to 3 substituents. Suitable aryl ring substituents e.g. phenyl ring substitutents may be $C_1$–$C_6$ alkyl, $C_1$–$C_6$ alkenyl, $C_1$–$C_6$ alkoxy, halogen, carboxy and nitro.

Examples of acrylates include methyl acrylate, ethyl acrylate, butyl acrylate, 2-ethylhexyl acrylate, isobornyl acrylate, and functional derivatives thereof such as 2-hydroxy ethyl acrylate, 2-chloro ethyl acrylate and the like. Such acrylates generally have from 1 to 12 carbons, preferably from 1 to 8 carbons.

Examples of methacrylates are methyl methacrylate, ethyl methacrylate, butyl methacrylate, 2-ethylhexyl methacrylate, isobornyl methacrylate, and functional derivatives thereof such as 2-hydroxy ethyl methacrylate, 2-chloro ethyl methacrylate and the like. Such methacrylates generally have from 1 to 12 carbons, preferably from 1 to 8 carbons.

Examples of (meth)acrylamides include (meth) acrylamide itself, N-methyl (meth)acrylamide, N,N'dimethyl (meth)acrylamide and the like.

Examples of acids and anhydrides include (meth)acrylic acid, maleic acid, maleic anhydride, vinyl sulphonic acid, itaconic acid.

Examples of other monomers includeamino olefins, vinyl pyridine, N-amino ethyl acrylamide, N-aminoethyl acrylate, isoprene, butadiene, and $C_2$–$C_8$ α-olefins such as ethylene, propylene, 1-butene, isobutene, 1-hexene, 1-octene and the like.

Particularly preferred monomers are styrene, methyl acrylate, methyl methacrylate, vinyl acetate and acrylonitrile.

A mixture of two or more monomers may be used. The monomers may also be polymerised with a natural or synthetic rubber or combination thereof, such that the resulting polymeric product comprises a polymer or copolymer of styrene having rubber grafted thereon.

Examples of rubbers include natural rubbers such as 1,4-polyisoprene, with those derived from the Hevea brasiliensis tree and quayule bush being useful. Synthetic rubbers include polybutadiene rubber, polyisoprene rubber, styrene-butadiene rubber, nitrile rubber, neoprene rubber, polysulphide rubber, polyacrylate rubber, epichlorohydrin rubber, fluoroelastomer, chlorosulphonated polyethylene rubber, polyurethane, or a thermoplastic rubber.

With regards to the polymerisation reaction using the catalyst composition herein described, the relative proportions of initiator and iron component are those effective to achieve the desired polymer product.

The molar ratio of initiator to monomer is chosen depending on the molecular weight of the product polymer to be achieved. For molecular weights of e.g. polystyrene or polymethyl methacrylate in the range 50 k–1 million the initiator may be present in a molar ratio of from $2 \times 10^{-3}$:1 to $10^{-4}$:1 relative to monomer, for molecular weight range 100 k–600 k the initiator is preferably present in a molar ratio of from $10^{-3}$:1 to $1.6 \times 10^{-4}$:1 relative to monomer and to obtain polymer product of molecular weight in the range 250 k–500 k, the initiator is preferably present in a molar ratio of from $4 \times 10^{-4}$: to $2 \times 10^{-4}$:1 relative to monomer.

The molar ratio of initiator to the iron component to effect polymerisation can depend upon the degree of solubility of the iron component in the reaction system but may be from $10^{-4}$:1 to 10:1, preferably from $10^{-1}$:1 to 5:1, more preferably from 0.3:1 to 2:1 and especially from 0.9:1 to 1.1:1.

The greater the degree of solubility of the iron component the greater the concentration of iron there will be present in the reaction system. Consequently in a homogeneous system the molar proportion of iron component to initiator may be reduced, e.g. $10^{-3}$:1.

The molar ratio of ligand:iron used is generally between 100:1 and 1:1, for example 5:1 to 1:1, and sometimes from 3:1 to 1:1.

The polymerisation of the present invention may be carried out in the presence of solvent or absence of solvent. Suitable solvents include protic and non-protic solvents such as water, aromatic hydrocarbon solvents, ethers, cylic ethers, $C_5$–$C_{10}$ alkanes, halogenated hydrocarbon solvents (which do not act as an initiator under the reaction conditions), acetonitrile, propionitrile, dimethylformamide and $C_1$–$C_6$ alcohols. Suitable aromatic hydrocarbon solvents include benzene, toluene, xylene (all isomers). Suitable ethers include diethyl ether, dimethoxyethane, diethoxyethane, diphenyl ether, anisole. Suitable cyclic ethers include dioxane and tetrahydrofuran. Suitable $C_5$–$C_{10}$ alkanes include hexane, heptane. Suitable halogenated hydrocarbon solvents include dichloromethane, 1,2 dichloroethane. Suitable $C_1$–$C_6$ alcohols include methanol, ethanol, propanol.

The polymerisation process is suitably carried out at a temperature in the range of from −20° C. to 200° C., suitably from 40° C. to 150° C., for example from 80° C. to 120° C. Alternative suitable temperature ranges are from 40 to 160° C., preferably from 40 to 85° C. for emulsion polymerisation, and from 80 to 160° C. for bulk polymerisation.

The polymerisation process of the present invention may be carried out in the presence of an activator, such as a Lewis acid activator. Typical Lewis acids which may be used include aluminium alkyls, e.g. methyl aluminium bis(2,6 di-tert-butylphenoxide), aluminium alkoxides such as aluminium tris(iso-propoxide), aluminium halides such as aluminium trichloride, alkyl zinc reagents such as diethyl zinc and boranes such as $BPh_3$ and $B(C_6F_5)_3$.

The use of an activator may increase the rate of polymerisation, for example the rate of polymerisation of (meth)acrylate esters of $C_1$–$C_{20}$ alcohols e.g. methyl methacrylate, and in particular methyl methacrylate polymerisation in the presence of an aluminium activator.

The molar ratio of activator to iron complex used may be, for example, in the range from 1:1 to 10:1 such as 2:1 to 6:1.

The polymerisation process may be carried out in bulk, solution, emulsion or suspension (slurry), as a single phase or multiple phases. Gas phase polymerisation can be carried out wherein the monomer in gaseous phase contacts a bed of the catalyst which has been previously contacted with the initiator(s) and ligand. Bulk polymerisations are particularly advantageous. The invention can be practiced as a batch, semicontinuous, or continuous process. Monomers, initiator, catalyst, and optionally solvent, are mixed together in a suitable reaction vessel. The order of component addition is not critical although it is desirable that monomer is present before others items are introduced. This vessel may be purged with an inert gas, such as nitrogen. The gas purge may be continued throughout reaction. Polymerisation may be carried out with all monomers present at the begining or with monomers added incrementally or continuously throughout the reaction. The reaction mixture may be agitated by any known method to mix components. The reaction is continued until the desired level of polymerisation has occurred, generally from about 40% to about 100% conversion of monomer to polymer. The reaction mixture may then be treated as required in subsequent steps to achieve the final desired product. For example, the reaction may be stopped by cooling, addition of inhibitor such as 4-methoxyphenol and the like, and discontinuing monomer feed. Alternatively, the reaction mixture may be taken on to further work-up stages such as monomer devolatalisation, catalyst removal steps, and/or polymer isolation.

The polymers and copolymers formed by the process of the present invention include straight and branched chain polymers and copolymers, star (co)polymers and the like. The copolymers can be random, alternating, block, graft, multiblock, straight chain, star, star block copolymers and the like. The (co)polymers may also be high impact polystyrene wherein a natural or synthetic rubber or a combination thereof is grafted onto the polymer or copolymer.

The polymers and copolymers may be further processed by moulding, spinning, extruding, and the like. Additives include lubricants, dyes, plasticisers, pigments, stabilisers, antistatic agents, antioxidants, fillers and blowing agents. Utilisations for the polymers and copolymers include moulded or foamed articles, sheets, films, pipes, tubings fibres and the like.

The present invention is illustrated in the following Examples

EXAMPLES

Preparation of Ligands

1. Preparation of t-Bu—N=CH—CH=N—t-Bu

Using a procedure based on a related preparation (Dieck et al, Z. Naturforsch, 1981, 36b, 823):—tbutylamine (25 g; 0.346 mol) was added dropwise over 10 minutes to a stirred solution of 40% aqueous glyoxal (25 g; 0.17 mol) in 100 ml methanol at 0° C. The solution was stirred for a further 30 minutes and then filtered to yield a white solid. The white solid was recrystallised from pentane to yield a white crystalline product.

2. Preparation of ArN=CH—CH=N—Ar, Ar=2,6—$C_6H_3(i-Pr)_2$

Preparation 1 was repeated except $ArNH_2$ was used instead of t-butylamine and was also carried out in the presence of a drop of formic acid as catalyst. The resultant product was a yellow crystalline solid.

Preparation of Iron (II) Components

3. Preparation of (ArN=CH—CH=N—Ar)$FeCl_2$, Ar=2,6—$C_6H_3(i-Pr)_2$

Dichloromethane solvent (ca.50 ml) was added to $FeCl_2$ (2.69 g; 0.021 mol) and ArN=CH—CH=N—Ar (Ar=2,6—$C_6H_3(i-Pr)_2$) (8.0 g; 0.021 mol) in a Schlenk vessel. After stirring the mixture at ambient temperature for 24 hours the reaction mixture turned dark green. Solvent was removed under reduced pressure to yield a dark green solid. The solid was washed three times with diethyl ether (20 ml) and then extracted into dichloromethane (ca. 60 ml). The resultant solution was concentrated and cooled to −30° C. to produce a dark green microcrystalline solid. The yield was 6.4 g (60%)

Mass spectrum: m/z 502 [M]+, 467 [M-Cl]+, 377 [M-$FeCl_2$]+

Analysis—Calculated: for $C_{26}H_{36}N_2Cl_2Fe$: C, 62.04; H, 7.21; N, 5.57. Found: C, 61.82; H, 7.08; N, 5.48.

4. Preparation of (t-Bu—N=CH—CH=N—t-Bu)$FeCl_2$

Preparation 3 was repeated except that the quantity of $FeCl_2$ used was 2.14 g; 0.017 mol and t-Bu—N=CH—CH=N—t-Bu (2.86 g; 0.017 mol) was used in place of ArN=CH—CH=N—Ar. The product was obtained as violet needles. The yield was 3.3 g (66%).

Mass spectrum: m/z 294 [M]+, 259 [M-Cl]+, 169 [M—$FeCl_2$]+

Analysis—Calculated: for $C_{10}H_{20}N_2Cl_2Fe$: C, 40.67; H, 6.83; N, 9.49. Found: C, 40.66; H, 6.60; N, 9.29.

Bulk Styrene Polymerisation Tests

The bulk polymerisation tests described in Runs 1 to 3 were carried out using the following procedure. Under an inert atmosphere (nitrogen) glove box the required quantities of (t-Bu—N=CH—CH=N—t-Bu)$FeCl_2$, initiator ($CCl_4$) and monomer (styrene) were weighed into a small glass ampoule. The contents of the sealed ampoule were then stirred and heated to the required temperature in an oil bath and maintained at this temperature for the required run time. After the required run time the ampoule was allowed to cool to ambient temperature. The resultant solid was dissolved in a small amount (ca. 5–15 ml) of dichloromethane. This solution was added to acidified methanol (ca. 300 ml) to precipitate the polymer which was subsequently filtered and dried in a vacuum oven.

The results of the styrene polymerisation tests are summarised in Table 1.

TABLE 1

| Example | Fe mmol | CCl₄ mmol | Styrene mmol | Temp. °C. | Run Time hrs | Yield % | Mw | Mn | Mw/Mn |
|---|---|---|---|---|---|---|---|---|---|
| 1 | 0.04 | 0.04 | 20.0 | 100 | 14 | 85 | 52700 | 41400 | 1.27 |
| 2 | 0.02 | 0.02 | 20.0 | 100 | 14 | 45 | 44700 | 34000 | 1.31 |
| 3 | 0.1 | 0.1 | 10.0 | 100 | 20 | 50 | 2240 | 1810 | 1.24 |

Methyl Methacrylate Polymerisation Tests

The procedure as described above for the styrene polymerisation tests was repeated for polymerisations tests 4–7 except that methyl methacrylate monomer was used instead of styrene monomer and in polymerisation test 7 the polymerisation was conducted in 5 ml of toluene solvent. used instead of styrene monomer and in polymerisation test 7 the polymerisation was conducted in 5 ml of toluene solvent.

The results of the methyl methacrylate polymerisation tests are summarised in Table 2.

TABLE 2

| Example | Fe mmol | CCl₄ mmol | Methyl methacrylate mmol | Temp °C. | Run Time hrs | Yield % | Mw | Mn | Mw/Mn |
|---|---|---|---|---|---|---|---|---|---|
| 4 | 0.1 | 0.1 | 10.0 | 40 | 20 | 63 | 113100 | 48600 | 2.33 |
| 5 | 0.1 | 0.1 | 10.0 | 60 | 20 | 45 | 116100 | 46900 | 2.48 |
| 6 | 0.1 | 0.1 | 10.0 | 100 | 20 | 85 | 59000 | 29400 | 2.01 |
| 7 | 0.1 | 0.1 | 10.0 | 80 | 20 | 26 | 19800 | 13000 | 1.52 |

The results in Tables 1 and 2 show that the iron catalysts of the present invention provide polymers having predetermined molecular weight and low polydispersity.

What is claimed is:

1. A catalyst composition comprising
   (i) an initiator having a radically transferable atom or group and
   (ii) a component of Formula I $$\{Fe[T]L\}.(T/b)X \quad \text{Formula I}$$

wherein
   Fe is iron and T its oxidation state
   L is a ligand of Formula II $$R^1N=CH-(CH_2)_n-CH=N-R^2 \quad \text{Formula II}$$

in which $R^1$ and $R^2$ are independently selected from $C_1$–$C_{10}$ alkyl, aryl or substituted aryl, and n is 0 or 1;
   X represents an atom or group covalently or ionically bonded to Fe; and
   b is the valency of the atom or group X.

2. The catalyst composition according to claim 1, wherein Fe[T] is Fe[II] or Fe[III].

3. The catalyst composition according to claim 1, wherein $R^1$ and $R^2$ are each independently $C_1$–$C_6$ alkyl, $C_6$–$C_{10}$ aryl or $C_7$–$C_{24}$ substituted aryl.

4. The catalyst composition according to claim 1, wherein $R^1$ and $R^2$ are each independently methyl, ethyl, n-propyl, i-propyl, n-butyl, t-butyl, n-hexyl, n-octyl, n-decyl or phenyl or phenyl substituted at one or more positions with one or more of methyl, ethyl, n-propyl, i-propyl, n-butyl or t-butyl.

5. The catalyst composition according to claim 1, wherein $R^1$ and $R^2$ are both 2,6 di-isopropyl phenyl or both t-butyl.

6. The catalyst composition according to claim 1, wherein n is zero.

7. The catalyst composition according to claim 1, wherein the initiator comprises an alkyl halide, activated alkyl halide or arenesulphonyl chloride.

8. The catalyst composition according to claim 1, wherein the initiator comprises $CCl_4$, $CHCl_3$, $CCl_3Br$ para-toluenesulphonyl chloride or para-methoxybenzenesulphonyl chloride.

9. The catalyst composition according to claim 1, wherein the molar ratio of initiator (i) to iron component (ii) is from $10^{-4}:1$ to $10:1$.

10. A process for the polymerization or copolymerization of a radically polymerizable monomer, which comprises contacting the monomer under polymerization conditions with a catalyst composition comprising
    (i) an initiator having a radically transferable atom or group and
    (ii) a component of Formula I $$\{Fe[T]L\}.(T/b)X \quad \text{Formula I}$$

wherein
    Fe is iron and T its oxidation state
    L is a ligand of Formula II $$R^1N=CH-(CH_2)_n-CH=N-R^2 \quad \text{Formula II}$$

in which $R^1$ and $R^2$ are independently selected from $C_1$–$C_{10}$ alkyl, aryl or substituted aryl, and n is 0 or 1;
    X represents an atom or group covalently or tonically bonded to Fe; and
    b is the valency of the atom or group X.

11. The process according to claim 10, wherein the monomer comprises ethylene; propylene; 1,3-butadiene; isoprene; (meth)acrylic acid; (meth)acrylic anhydride; (meth)acrylamide; vinyl chloride; (meth)acrylonitrile; (meth)acrylate esters of $C_1$–$C_{20}$ alcohols; a vinyl ester of a $C_1$–$C_{20}$ alcohol; a vinyl ketone having up to 8 carbon atoms; or a vinyl substituted aryl.

12. The process according to claim 10, wherein the monomer comprises a vinyl substituted aryl in which the aryl ring is substituted by at least one vinyl group, which is optionally substituted with $C_1$–$C_6$ alkyl, and the aryl ring is also optionally substituted by up to three substituents comprising $C_1$–$C_6$ alkyl, $C_1$–$C_6$ alkenyl, $C_1$–$C_6$ alkoxy, halogen, carboxy or nitro.

13. The process according to claim 10, wherein the monomer comprises styrene or 1,4-divinyl benzene.

14. The process according to claim 10, which is carried out at a temperature in the range of from 40 to 160° C.

15. The process according to claim 10, which is carried out in the presence of an activator.

16. The process according to claim 15, wherein the activator comprises an aluminium alkyl, aluminium alkoxide, aluminium halide, alkyl zinc reagent or borane.

17. The process according to claim 10, wherein the polymerization conditions are solution phase, slurry phase or gas phase.

* * * * *